(12) United States Patent
Williams

(10) Patent No.: US 6,494,285 B1
(45) Date of Patent: Dec. 17, 2002

(54) VEHICLE CHASSIS WITH INTEGRAL DROP DECK

(75) Inventor: Timothy R. Williams, Charlotte, MI (US)

(73) Assignee: Spartan Motors, Inc., Charlotte, MI (US)

(*) Notice: Subject to any disclaimer, the term of this patent is extended or adjusted under 35 U.S.C. 154(b) by 0 days.

(21) Appl. No.: 09/722,909

(22) Filed: Nov. 27, 2000

(51) Int. Cl.[7] .............................. B60K 5/02; B60P 1/44
(52) U.S. Cl. ................... 180/291; 180/58; 414/545; 414/557
(58) Field of Search .............................. 180/291, 298, 180/299, 58; 414/557, 545

(56) References Cited

U.S. PATENT DOCUMENTS

| | | | |
|---|---|---|---|
| 2,792,135 A | * 5/1957 | Wood | 414/557 |
| 3,534,874 A | * 10/1970 | Long | 414/557 |
| 3,989,119 A | * 11/1976 | Cady | 180/291 |
| 4,005,788 A | * 2/1977 | Ratliff | 414/557 |
| 4,253,699 A | 3/1981 | Frank | |
| 4,333,191 A | 6/1982 | Long | |
| 4,618,022 A | * 10/1986 | Hayashi | 180/298 |
| 4,805,720 A | * 2/1989 | Clenet | 180/298 |
| 5,114,183 A | 5/1992 | Haluda et al. | |
| 5,253,973 A | * 10/1993 | Fretwell | 414/557 |
| 5,314,205 A | 5/1994 | Glesmann | |
| 5,374,094 A | 12/1994 | Smith et al. | |
| 5,501,504 A | 3/1996 | Kunz | |
| 5,577,571 A | * 11/1996 | Rizzoli | 180/298 |
| 5,588,793 A | * 12/1996 | Chang | 414/557 |
| 5,597,282 A | * 1/1997 | Hoffman et al. | 414/557 |
| 5,609,350 A | 3/1997 | Chumley et al. | |
| 5,662,373 A | 9/1997 | Hanemaayer | |
| 5,827,037 A | * 10/1998 | Wilson, Jr. | 414/557 |
| 5,863,070 A | 1/1999 | Williams et al. | |
| 5,921,615 A | 7/1999 | Gimenez | |
| 5,967,583 A | 10/1999 | Wishart | |
| 5,967,596 A | 10/1999 | Knoop | |
| 6,007,290 A | 12/1999 | Schulz et al. | |
| 6,022,048 A | * 2/2000 | Harshbarger et al. | 180/298 |
| 6,070,689 A | 6/2000 | Tanaka et al. | |
| 6,164,895 A | * 12/2000 | Croswell | 414/557 |

OTHER PUBLICATIONS

Fleetwood RV—Travel Trailers and fifth Wheels 2001 brochure First Edition, Jun. 2000.

* cited by examiner

Primary Examiner—Brian L. Johnson
Assistant Examiner—Jeff Restifo
(74) Attorney, Agent, or Firm—John M. Naber

(57) ABSTRACT

An improved heavy vehicle chassis for recreational vehicles, busses and trucks is provided. According to the invention, the chassis has a front frame chassis subcomponent and a rear chassis subcomponent. The front chassis subcomponent contains appropriate chassis subcomponents such as wheels, axles, a suspension unit, braking and steering apparatus. In the preferred embodiment, the engine is disposed between the front chassis subcomponent axles allowing better handling, turning, and maneuverability, while not significantly reducing overall vehicle ground clearance. In the preferred embodiment of the present invention, the rear chassis configuration has increased storage capacity to accept items as large as additional recreational vehicles such as a personal water craft, golf cart, dirt bike, and the like. A drop deck can be added to assist in delivering the small recreational vehicle to ground level.

9 Claims, 6 Drawing Sheets

VEHICLE CHASSIS WITH INTEGRAL DROP DECK

BACKGROUND OF THE INVENTION

1. Field of the Invention

The present invention relates to a heavy vehicle chassis configuration, and more particularly, to a mid-engine chassis configuration suited for use in a recreational vehicle, bus, or truck that can also include a large rear storage space with a drop deck for carrying small recreation vehicles.

2. Background and Description of the Prior Art

A "heavy" vehicle typically refers to a vehicle weighing more than 10,000 pounds. These vehicles usually have an engine mounted forward of the front axle. Rear engine configurations (where the engine is mounted behind the rear axle) are also known, in fact common, in large recreational vehicle chassis designs and are often referred to as "pushers." The chassis in heavy vehicles house mechanical workings such as suspension, engine, drivetrain, and braking systems. Recreational vehicle construction includes a chassis, a superstructure, and a body. See Generally, U.S. Pat. No. 5,863,070, Williams, et al., and U.S. Pat. No. , 5,314,205, Glesmann.

Heavy vehicles, not surprisingly, require heavy engines to propel them. Front and rear mounted engines create a relatively unbalanced vehicle. Further, in recreational vehicle applications, front end engine placement creates a large engine housing extending into the recreational vehicle body as well as subjecting occupants to excessive engine noise. This significantly reduces driver and passenger space and comfort in the front of the vehicle. The popular rear engine chassis configuration also results in a large engine housing that usually occupies most of the rear of the chassis extending upwards into the rear body of the recreational vehicle. In either case, the recreational vehicle designer is faced with restricting space in the front or rear of the recreational vehicle to accommodate the engine housing.

Engine placement between the heavy vehicle chassis' axles, "mid-engine," is desirable and would eliminate both space restrictions. Small mid-engine vehicles are known in the prior art. These vehicles' center of gravity between the front and rear axles allows improved handling performance. Further, the distribution of load to the front and rear wheels is more uniform and provides well-balanced performance when the vehicle is in motion. This is due to a reduced inertial force about a yaw axis, as compared with either a front or rear mounted engine. See generally, U.S. Pat. No. 6,070,689, Tanaka, et al.

Mid-engine placement in a heavy vehicle chassis is unknown by this inventor, but would deliver the same benefits as smaller mid-engine vehicles. A mid-engine configuration would also allow more design flexibility and conveniences previously unknown. For example, a conventional recreational vehicle can only tow one vehicle behind it.

Often, an automobile or sport utility vehicle is towed for local travel once a destination is reached. Towing these vehicles restricts options to bring an additional recreational vehicle such as a personal water craft, golf cart, dirt bike, and the like.

When the engine is not placed in the rear of the chassis (such as a mid-engine or even a front engine configuration) the rear chassis could be used to develop a large storage area to house and support an additional recreational vehicle. A hinged drop deck could even be attached to the chassis to assist in delivering the small recreational vehicle to ground level.

Thus, there is a desire and need for an improved heavy vehicle chassis to improve vehicle balance, handling, ride, and maneuverability while adding additional design flexibility.

SUMMARY OF THE INVENTION

Accordingly, the present invention provides an improved heavy vehicle chassis that improves vehicle balance, handling, ride, and maneuverability.

Another object of the present invention is to provide an improved vehicle chassis that improves the vehicle center of gravity over existing methods of construction.

Another object of the present invention is to provide an improved heavy vehicle chassis.

Another object of the present invention is to provide an improved recreational vehicle chassis that allows design flexibility to the vehicle chassis, superstructure, and body.

Another object of the present invention is to provide an improved recreational vehicle chassis that allows the addition of a large rearward storage space.

Another object of the present invention is to provide an improved recreational vehicle chassis that allows the addition of a large rearward storage space that also has a drop deck to assist in delivering the small recreational vehicle to ground level.

Another object of the present invention is to provide an improved vehicle chassis that does not significantly lower ground clearance.

Another object of the present invention is to provide an improved vehicle chassis that is economical to produce.

Other objects of the present invention will become more apparent to persons having ordinary skill in the art to which the present invention pertains from the following description taken in conjunction with the accompanying figures.

BRIEF DESCRIPTION OF THE FIGURES

The foregoing objects, advantages, and features, as well as other objects and advantages, will become apparent with reference to the description and drawings below, in which like numerals represent like elements and in which.

DETAILED DESCRIPTION OF THE PREFERRED EMBODIMENTS

Figure 1:
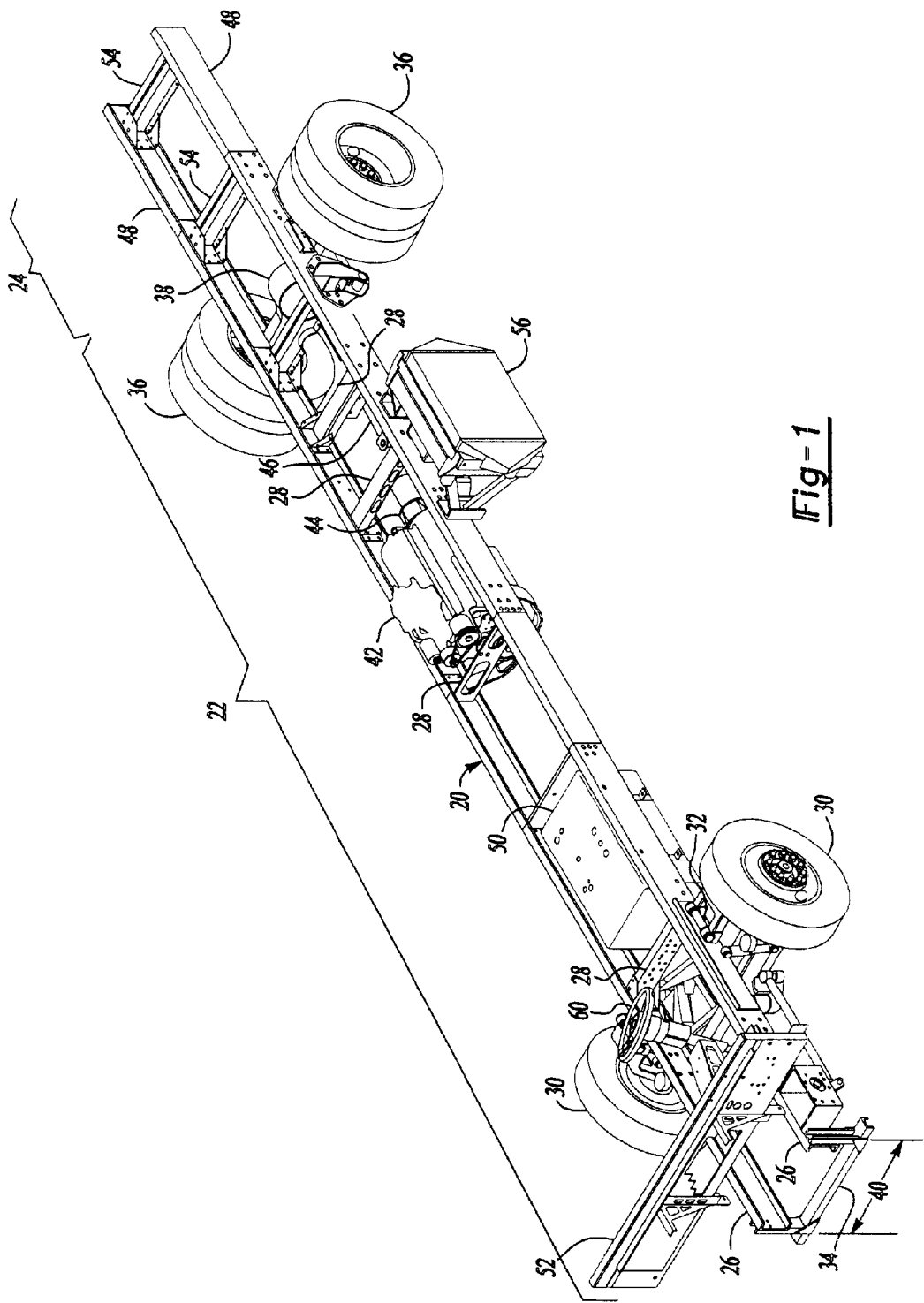
FIG. 1 illustrates a perspective view of one embodiment.

The present invention generally relates to an improved vehicle chassis. FIG. 1 illustrates the one embodiment, and not by way of limitation, a perspective view of a mid-engine recreational vehicle Chassis 20. The Chassis 20 has two major components: a Front Chassis Subcomponent 22 and a Rear Chassis Subcomponent 24.

Two Front Frame Rails 26 run longitudinally along the Front Chassis Subcomponent 22 beginning at a point beyond a set of Front Wheels 30, a Front Axle and Suspension Assembly 32, and running rearward to a point beyond a set of Rear Wheels 36, and a Rear Axle and Suspension Assembly 38. The distance beyond which the Front Frame Rails 26 run past the wheels and axle and suspension assemblies is dictated by good engineering principles that, in turn, are governed by the length, gross vehicle weight and suspension requirements of a particular vehicle. The Front Frame Rails 26 are preferably made of steel approximately eight to ten inches in height. At least two Intermediate Cross-members 28 lay perpendicular to and affix to the Front Frame Rails 26 at predetermined points and are cut to a length to define a Width 40 of the Front Chassis Subcomponent 22. The Intermediate Cross-members 28 add strength the Front Chassis Subcomponent 22. The Width 40 of the Front Chassis Subcomponent 22 is a distance governed by the engineering needs of the particular vehicle, including the space needed to house an Engine 42, Transmission 44, and Driveshaft 46.

In this embodiment, the Transmission 44 and Driveshaft 46 are coupled to the Rear Wheels 36. Alternatively, the vehicle could be configured to couple a powertrain to the Front Wheels 30 by mounting the Engine 42, Transmission 44, and Driveshaft 46 at 180 degrees to the configuration shown.

Figure 3:
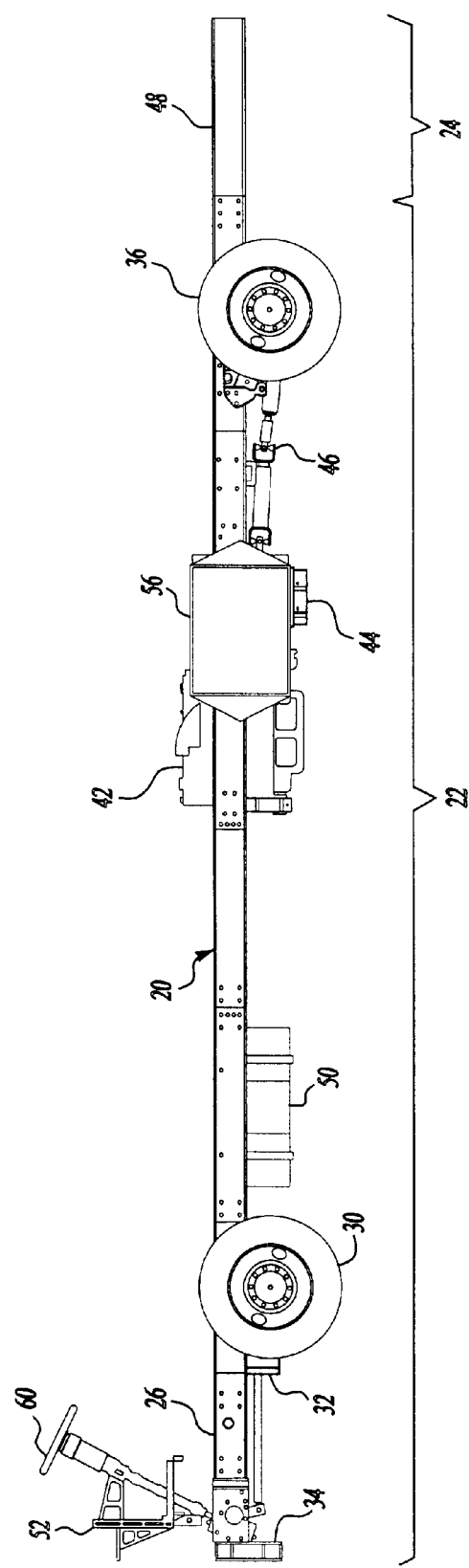
FIG. 3 illustrates a side view of one embodiment.

The configuration illustrated in FIG. 1 shows the Engine 42 situated to evenly distribute the Engine 42 weight roughly equally to each of the vehicle's wheels. Nevertheless, the objects of the present invention can be met by placing the Engine anywhere between the axles. FIG. 3 illustrates the Engine can be disposed predominately between and below the two from frame rails 26.

The Rear Chassis Subcomponent 24 can be designed much the same way as the Front Chassis Subcomponent 22. Additional engineering considerations for the manufacture of the Rear Chassis Subcomponent 24 are dictated by space configurations of a particular vehicle. In one embodiment illustrated in FIG. 1, two Rear Frame Rails 48 run longitudinally along the Rear Chassis Subcomponent 24 beginning at and attached to the rearward most end of the Front Chassis subcomponent 22 (using typical means such as bolting or welding) and running rearward to a point dictated by good engineering principles that, in turn, are governed by the length, gross vehicle weight, and suspension requirements of a particular vehicle. Alternatively, the Front Frame Rails 26 and the Rear Frame Rails 48 could actually be combined into a pair of continuous rails (not shown).

Perpendicular to the Rear Frame Rails 48 is at least one Rear Frame Cross-member 54. The Rear Frame Crossmember 54 offers strength to the Rear Chassis Subcomponent 24 and affixed at various spaced intervals to the Rear Frame Rails 48 using typical means such as bolting or welding.

The Chassis 20 also houses other components that can be mounted in a variety configurations. FIG. 1, by way of example, places a Fuel Tank 50 between the Front Frame Rails 26 and between the Engine 42 and Front Axle and Suspension Assembly 32. A Bulkhead 52 is mounted on the Front Frame Rails 26 forward of the Front Wheels 30. A Radiator 56 is mounted adjacent to the Engine 42 on an outer wall of one of the Front Frame Rails 26.

Figure 2:
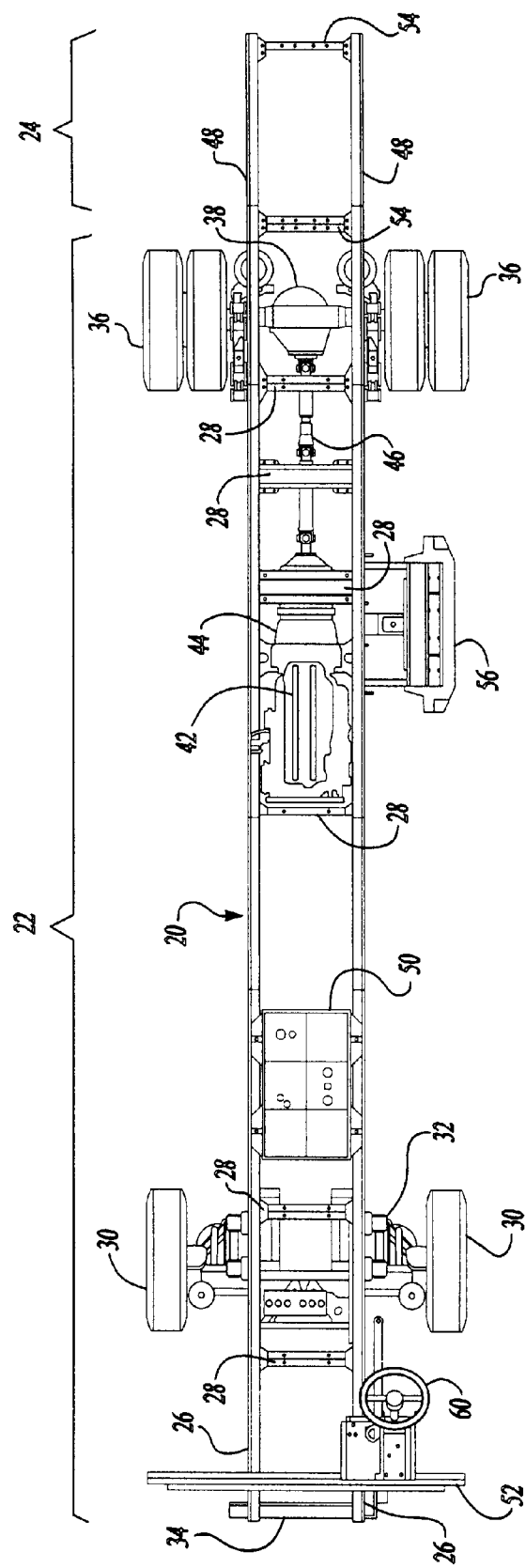
FIG. 2 illustrates a top view of one embodiment.
Figure 4:
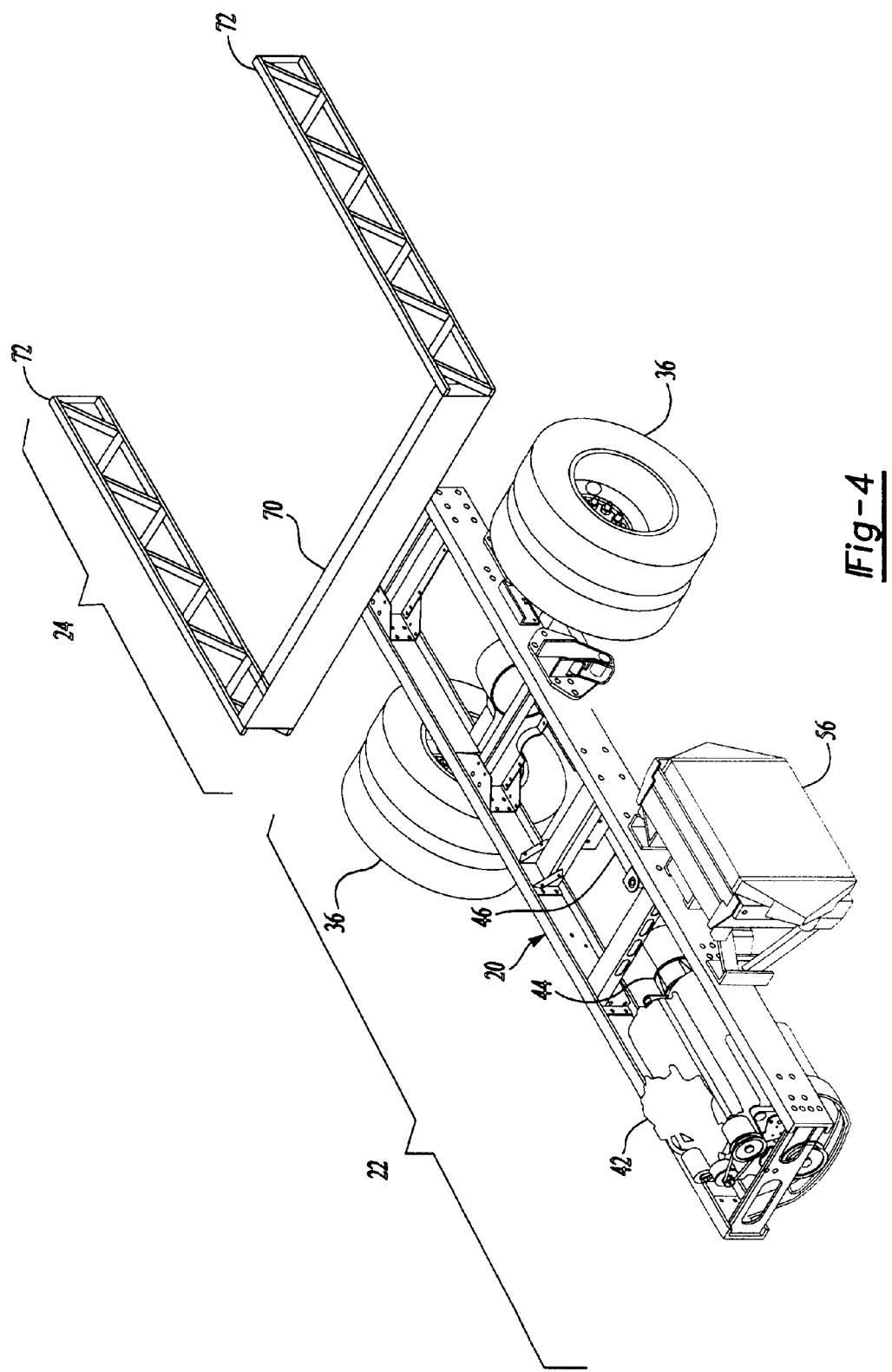
FIG. 4 illustrates a perspective view of the preferred embodiment.

Other views of the preferred embodiment illustrated in FIG. 1 are illustrated in FIGS. 2 and 3. FIG. 4 illustrates the preferred embodiment of the invention. This embodiment uses the advantages of mid-engine placement to develop the capability of a large rearward storage space in a recreational vehicle. Although, a mid-engine configuration is preferred, the storage space could also be incorporated into a front engine chassis design.

FIG. 4 shows the preferred embodiment wherein the Rear Frame Rails 48 and Rear Frame Cross-members 54 are not present and replaced with an Extended Rear Frame Crossmember 70. The Extended Rear Frame Cross-member 70 is sized to essentially represent the width of the vehicle body and is attached to the rearward most end of the Front Chassis subcomponent 22 (using typical means such as bolting or welding). This embodiment allows for the attachment of a pair of Truss Frame Assemblies 72 to a superstructure of the recreational vehicle to mount a body for the vehicle (not shown).

Figure 5:
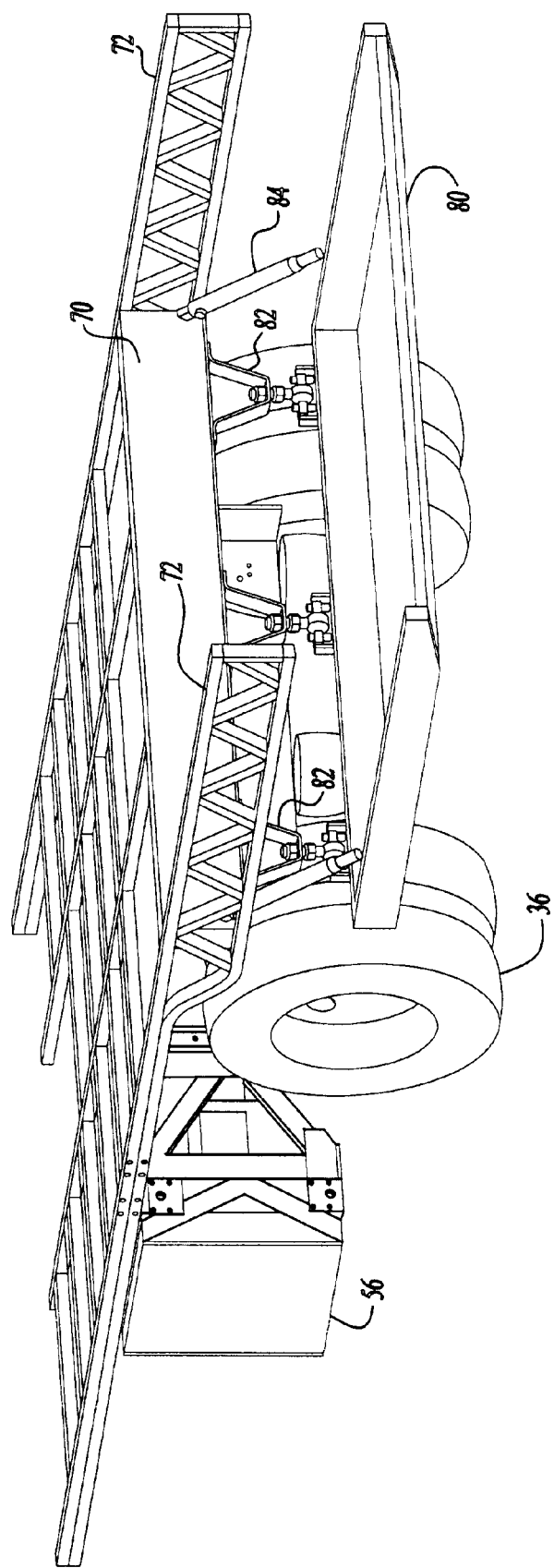
FIG. 5 illustrates a perspective view of the preferred embodiment adding a hingedly mounted drop deck.

FIG. 5 illustrates a perspective view of the preferred embodiment adding a hingedly mounted drop deck attached to the Extended Rear Frame Cross-member 70 and in a raised position. This chassis configuration allows the vehicle to bring an additional recreational vehicle such as a personal water craft, golf cart, dirt bike, and the like.

Figure 6:
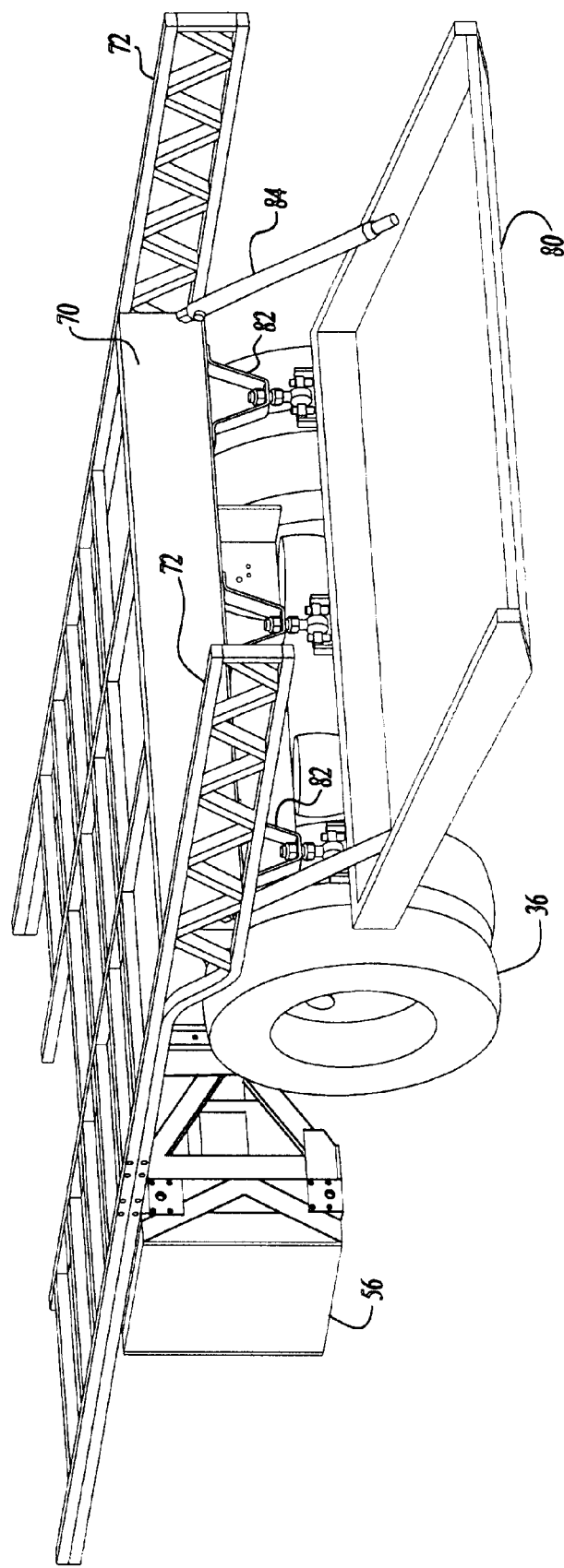
FIG. 6 illustrates a perspective view of the preferred embodiment showing the drop deck in a lowered position.

In this configuration, a Drop Deck 80 is mounted to the Extended Rear Frame Cross-member 70 by a pair of Hinges 82. A pair of Hydraulic Lift Cylinders 84 attach to the Extended Rear Frame Cross-member 70 and edges of the Drop Deck 80 provide the force to raise and lower the Drop Deck 80. FIG. 6 illustrates a perspective view of the alternative embodiment showing the drop deck in a lowered position.

The Figures show that assembly of the inventive device requires the Front Chassis subcomponent 22 and the Rear Chassis Subcomponent 24 be sized to accommodate the length requirements of the final Chassis 20.

Further, Engine 42 placement of the inventive device must be configured to: allow sufficient ground clearance, provide easy access for maintenance, improve handling and maneuverability, while not raising the vehicle's overall center of gravity or significantly increasing vehicle cost.

The above description is that of a preferred embodiment of the invention. Various alterations and changes can be made without departing from the spirit and broader aspects of the invention as set forth in the appended claims, which are to be interpreted in accordance with the principles of patent law, including the doctrine of equivalence. The embodiment of the invention in which exclusive property or privileges claimed are defined as follows.

I claim:

1. A heavy vehicle- chassis, comprising:
    an engine disposed between a front axle having left and right front wheels and a rear axle having left and right rear wheels;
    a front chassis subcomponent being substantially rectangular in shape, comprising two front frame rails extending along a longitudinal axis of the chassis at an outer width of the chassis having frontward and rearward ends, the front chassis subcomponent attached perpendicular to the front axle and rear axle with the engine attached and disposed predominately between and below the two front frame rails and a plurality of frame cross-members structurally interconnecting said two front frame rails;
    a rear chassis subcomponent being substantially rectangular in shape, comprising two rear frame rails extending along the longitudinal axis of the chassis at the outer width of the chassis having frontward and rearward ends, at least one cross member perpendicular to and affixed to at least one end of the rear frame rails; and the front chassis subcomponent and rear chassis subcomponent being aligned and affixed to one another, the rearward ends of the front chassis subcomponent frame rails being affixed to the frontward ends of the rear chassis subcomponent frame rails.

2. The heavy vehicle chassis of claim 1, wherein:

a transmission is disposed behind the engine for providing a power transfer path between the engine and at least one of the front axle and the rear axle; and wherein the transmission is operatively connected to at least one of the front axle and the rear axle via a driveshaft that forms part of the power transfer path.

3. The heavy vehicle chassis of claim 1, wherein:

said front chassis subcomponent is substantially rectangular in shape, comprising said two front frame rails extending along a longitudinal axis of the chassis at an outer width of the chassis, the front chassis subcomponent being attached perpendicularly to the front axle and rear axle with the engine attached and disposed between and extending below the two front frame rails;

the rear frame cross-member attached perpendicular to the rearward most ends of the front frame rails extending laterally therefrom to essentially represent the width of the vehicle body; and a superstructure attached to said rear-frame cross-member ends forming a large rear storage space.

4. The heavy vehicle chassis of claim 3, wherein the large rearward storage space further comprises a drop deck hingedly mounted to the chassis, and a pair of hydraulic lift cylinders attached to the chassis and opposite edges of the drop deck, whereby force is provided to raise and lower the drop deck to deliver a small recreational vehicle supported on said deck to ground level.

5. The heavy vehicle chassis of claim 4, wherein the drop deck is hingedly mounted to the extended rear frame cross-member by a plurality of hinges, and the pair of said hydraulic lift cylinders are attached to the extended rear frame cross-member.

6. The heavy vehicle chassis of claim 1, wherein the engine extends below said frame rails whereby the vehicle's center of gravity is lowered.

7. The heavy vehicle chassis of claim 1, wherein the two front frame rails extend longitudinally from the front of the chassis at a predetermined point forward of the front axle; and the two front frame rails extend longitudinally toward the rear of the chassis to a predetermined point rearward from the rear axle.

8. A heavy vehicle chassis, comprising:

an engine disposed in front of a front axle having left and right front wheels;

a front chassis subcomponent being substantially rectangular in shape, comprising two front frame rails having frontward and rearward ends extending along a longitudinal axis of the chassis at an outer width of the chassis, the front chassis subcomponent attached perpendicular to the front axle and a rear axle with the engine attached and disposed between the two front frame rails;

an extended rear frame cross-member having ends, the extended rear frame cross-member attached perpendicularly to the rearward most ends of the front frame rails and sized to essentially represent the width of the vehicle body and attached to the rearward most end of the front chassis subcomponent said extended rear frame cross-member being positioned rearwardly of said rear axle;

a superstructure attached to the extended rear frame cross-member ends allowing the formation of a large rearward storage space; and a drop deck hingedly mounted to the extended rear frame cross-member, and a pair of hydraulic lift cylinders attached to the chassis and edges of the drop deck, whereby force is provided to raise and lower the drop deck for delivering a small recreational vehicle supported on said drop deck to ground level.

9. The heavy vehicle chassis of claim 8, wherein the drop deck is hingedly mounted to the extended rear frame cross-member by a pair of hinges, and the pair of hydraulic lift cylinders are attached to opposite ends of the extended rear frame cross-member.

* * * * *